UNITED STATES PATENT OFFICE.

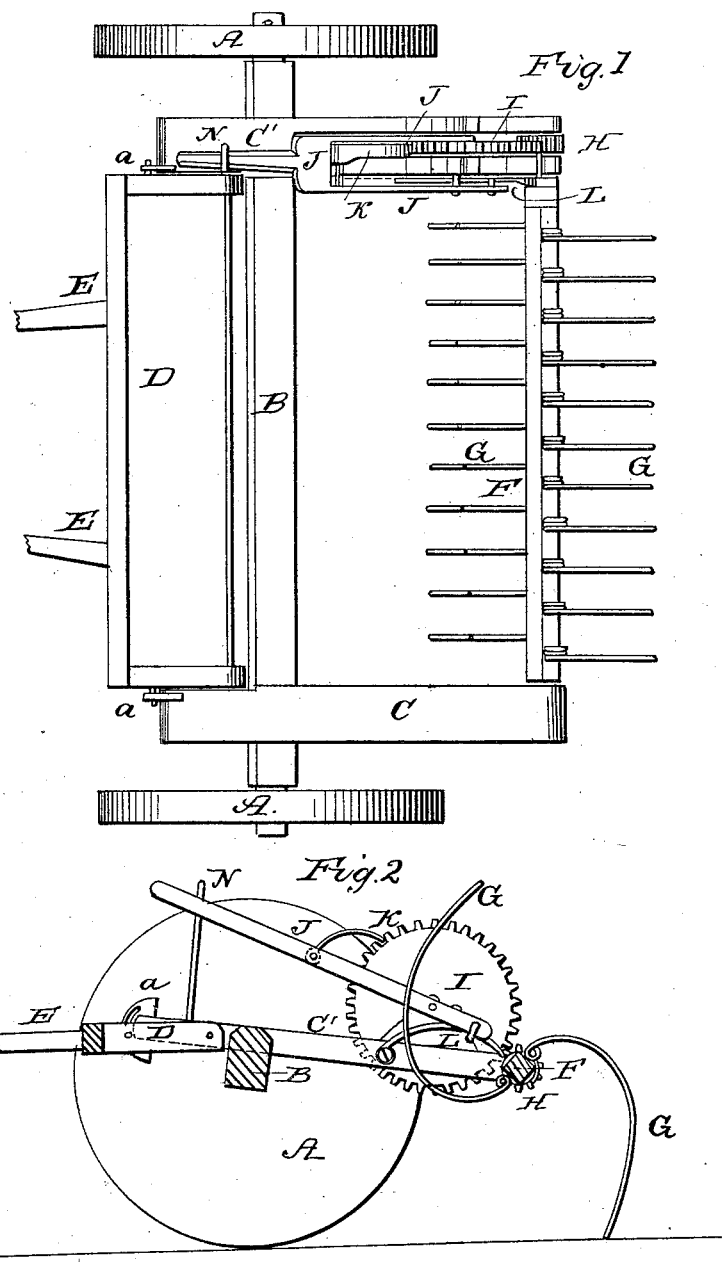

A. B. JOHNSON, OF WASHINGTON, INDIANA.

IMPROVEMENT IN HORSE HAY-RAKES.

Specification forming part of Letters Patent No. 27,366, dated March 6, 1860.

*To all whom it may concern:*

Be it known that I, A. B. JOHNSON, of Washington, in the county of Daviess and State of Indiana, have invented a new and Improved Hay-Rake; and I do hereby declare that the following is a full, clear, and exact description thereof, reference being had to the accompanying drawings, forming a part of this specification, in which—

Figure 1 represents a plan view of my machine mounted upon the wheels and axle of an ordinary carriage or wagon. Fig. 2 is a vertical longitudinal section taken through Fig. 1, showing clearly the improved mechanism for operating the rakes.

Similar letters of reference indicate corresponding parts in both figures.

In the drawings, A A are the wheels, and B the axle, of any ordinary vehicle, to which my hay-raking device is shown attached by simple bolts and nuts; or any other suitable attachment may be made which will be found most convenient.

The double rake is hung in the rear of two arms, C C′, which arms form the frame of the machine for supporting the mechanism for operating the rakes. In front of these arms is a jointed frame, D, to which the thills E are attached. This latter frame may be secured in any desired position, so as to adjust the rakes to suit the various heights of wheels used, by slotted segments $a$ $a$, which are secured to the front ends of the beams C C′, and through the slots of which are bolts with nuts on them for fixing the beams C C′ in any desired inclination.

The rake-head F, having the rakes or tines G projecting out from opposite sides, has a pinion spur-wheel, H, on one end, which engages with the teeth of a large wheel, I, which latter wheel is fixed to a short shaft having its bearings in standards projecting up from arm C′. The shaft of this spur-wheel I serves as the fulcrum for a bifurcated lever, J, which proceeds forward of the axle B to a convenient situation for the driver to operate it. K is a spring-pawl which is attached to the lever J, and which engages with the teeth of the spur-wheel I.

One arm of the lever J projects beyond the shaft of the wheel I sufficiently to receive and operate a stop-pawl, L, which is attached to the inside of the arm C′ and rests upon the surface of the rake-head F, as shown clearly by the drawings, and comes in contact with stops or teeth on said surface when the bifurcated lever J is in an elevated position, in which position it is held by a curved arm, N, projecting up from the arm C′; but when the lever J is depressed by the driver the rakes are free to revolve, and can be turned by the lever J through the medium of the pawl K, wheel I, and pinion H.

It will thus be seen from the above description that the driver can discharge the gathered hay from one rake and bring the opposite rake into action by simply raising and depressing the lever J, and also that the rakes will be firmly held in the desired position by the stop-pawl L, which is operated by the lever J, so that the rakes may be turned freely when occasion requires, and so that it will serve to fix them when they are brought to the desired position for the raking of hay into windrows.

When the harvest is ended the frame-work of the hay-gatherer may be readily detached from the axle and stowed away in a loft or other convenient place.

Having thus described my invention, what I claim, and desire to secure by Letters Patent, is—

The combination of the lever J, pawl K, wheels I and H, and stop-pawl L, in combination with a double rake, arranged and operating in the manner herein set forth.

A. B. JOHNSON.

Witnesses:
   A. G. WILLIAMS,
   J. H. MERIDITH.